United States Patent [19]

Gaerte

[11] Patent Number: 4,964,741
[45] Date of Patent: Oct. 23, 1990

[54] ROLLER ASSEMBLY

[76] Inventor: Earl Gaerte, 601 Monroe, Rochester, Ind. 46975

[21] Appl. No.: 478,555

[22] Filed: Feb. 12, 1990

[51] Int. Cl.⁵ ............................................. F16C 33/66
[52] U.S. Cl. .................................. 384/475; 384/449; 123/90.48
[58] Field of Search ............... 384/475, 449, 586, 589, 384/543; 123/90.48

[56] References Cited

U.S. PATENT DOCUMENTS

| | | | |
|---|---|---|---|
| 981,307 | 1/1911 | Ragsdale | 384/586 |
| 3,408,123 | 10/1968 | Zwicky | 384/475 |
| 4,798,149 | 1/1989 | Hoffmann | 384/449 |
| 4,824,264 | 4/1989 | Hoebel | 384/475 |

Primary Examiner—Lenard A. Footland
Attorney, Agent, or Firm—Thomas J. Dodd

[57] ABSTRACT

A roller assembly which circumscribes a rotative axle in an engine. The tappet includes spaced holes, usually staggered which allow for distribution of lubricant or coolant fluid to the bearings which lie between the tappet and the axle.

5 Claims, 1 Drawing Sheet

U.S. Patent    Oct. 23, 1990    4,964,741
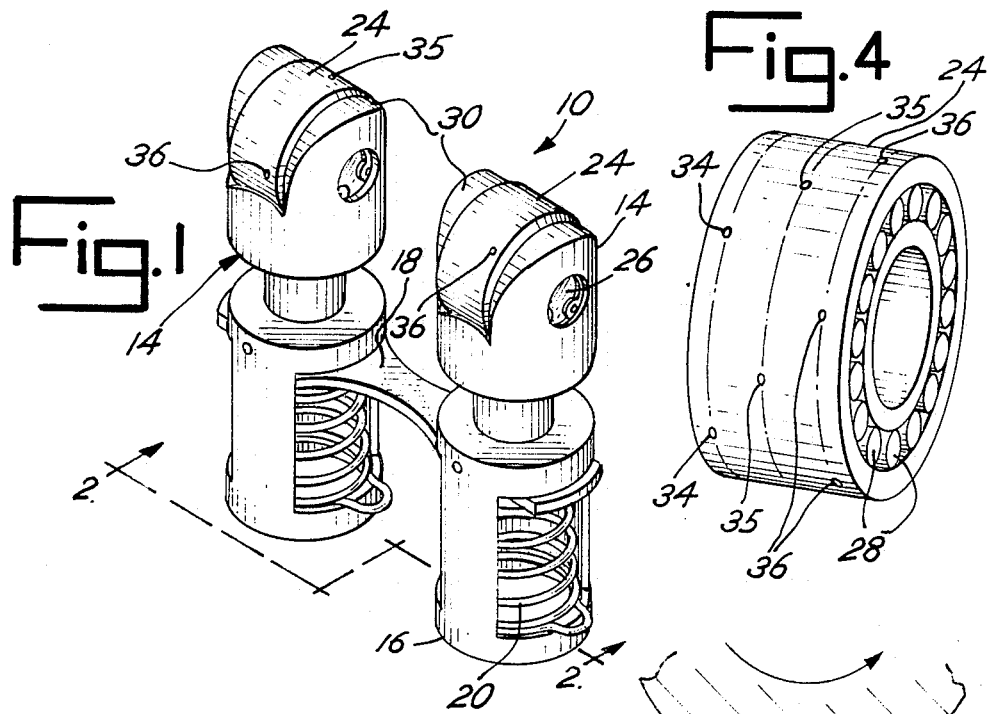
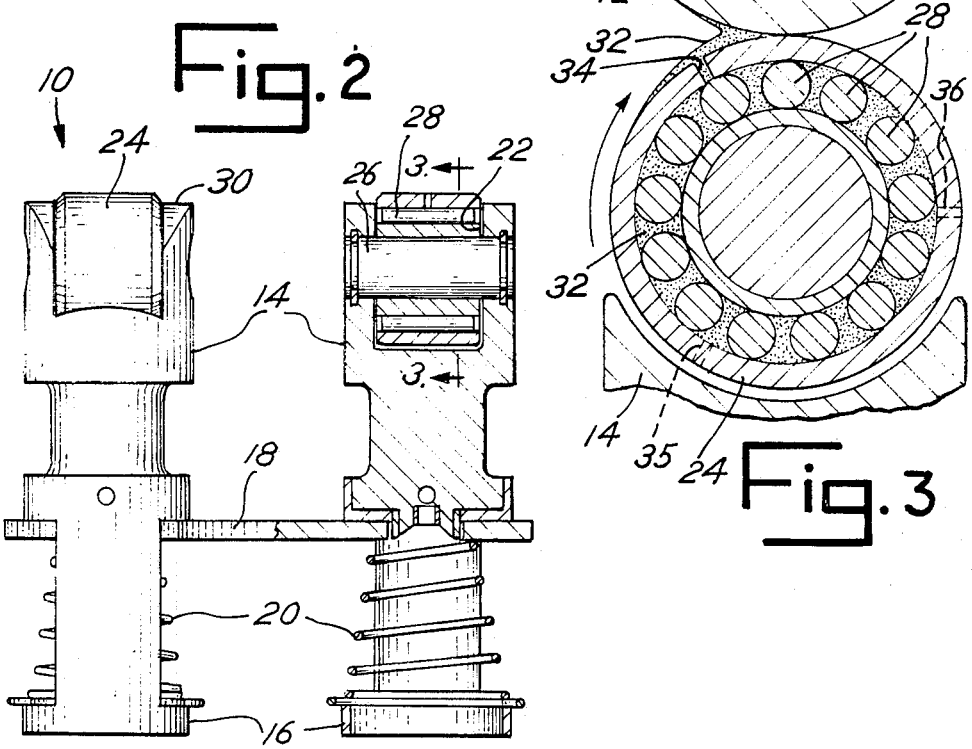

ROLLER ASSEMBLY

SUMMARY OF THE INVENTION

This invention relates to rollers and will have application to roller assemblies which allow for distribution of lubricant or coolant fluid to the underlying bearings.

Roller tappets and other similar cam followers have always presented problems of circulating lubricant or coolant to the internal bearings which lie between the roller and the axle on which the roller turns. Previously, only small amounts of fluid reached the bearings through minute gaps in the tappet housing. As a result, tappet life was severely limited due to the evaporation and/or burning of the fluid as the engine built up heat.

The roller tappet of this invention allows for continual circulation of lubricant or coolant fluid to the internal bearings. Holes are drilled through the roller which communicate with the internal bearings and which serve as conduits for the fluid. The holes may be staggered to further increase circulation. By providing for increased circulation of lubricant and/or coolant to the bearings, tappet life is dramatically lengthened.

Accordingly, it is an object of this invention to provide for a roller which has improved fluid circulation to underlying bearings.

Another object is to provide for a roller which has an increased lifespan.

Another object is to provide for a cam follower or tappet which is efficient and economical to produce.

Other objects of this invention will become apparent upon a reading of the following description.

BRIEF DESCRIPTION OF THE DRAWINGS

A preferred embodiment of the invention has been depicted for illustrative purposes only wherein:

FIG. 1 is a perspective view of the roller of this invention shown in use as a cam follower, with portions broken away for illustrative purposes.

FIG. 2 is a cross-sectional view taken along line 2—2 of FIG. 1.

FIG. 3 is an exploded view of the roller assembly.

FIG. 4 is a perspective view of the roller.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize its teachings.

As seen in the drawings, reference numeral 10 refers generally to the roller assembly of this invention. Roller assembly 10 is shown in use as a tappet in association with a rotating cam shaft 12 but will doubtless find numerous other uses in internal combustion engines, industrial machinery applications, and other applications which utilize cams and cam followers.

As shown in FIGS. 1 and 2, assembly 10 includes roller housings 14 which are identical in construction for purposes of illustration. Each housing 14 is connected to a valve housing 16 which is part of the firing systems in an internal combustion engine (not shown). Valve housings 16 are connected by tappet bar 18 which is biased by spring 20 in each valve housing. The connection and configuration of valve housings 16 is conventional and well-known and does not form a part of this invention.

Each roller housing 14 is preferably machined or cast metal of the generally cylindrical shape shown. A notch 22 is defined near the outer portion of housing 14 away from valve housing 16. Roller 24 is accommodated within notch 22 and rotates about axle 26 which is fixed in housing 14 at right angles relative to the notch as shown. A plurality of bearings, shown as needle bearings 28 are positioned between roller 24 and axle 26 to facilitate rotation of the roller about the axle and evenly distribute the camming force of shaft 12 along the entire outer surface of the roller.

The upper edges 30 of roller housing 14 are preferably rounded as shown and allow the roller 24 to extend outwardly of the roller housing to accommodate contact between the roller and cam shaft 12. The side edges of roller 24 are preferably in very close proximity to the inner walls of notch 22 to insure accurate movement of the roller relative to cam shaft 12 and to prevent sidewise sliding of the roller along axle 26.

As is common, cam shaft 12 is lubricated and/or cooled by fluid 32 which is pumped directly onto the shaft. Roller assembly 10, as is common is supplied lubricant as it runs off the cam shaft 12. As such, the tight fit between rollers 24 and roller housings 14 prevents adequate distribution of fluid 32 to bearings 28 and axle 26 with the result that these parts of assembly wear out quickly due to friction and heat buildup.

As shown in FIGS. 2 and 4, roller 24 of this invention has a plurality of holes 34, 35, 36 which extend from the outer surface of the roller continuously through to the inner surface of the roller. Holes 34-36 provide for fluid communication between the outer surface of roller 24, bearings 28 and axle 26. Holes 34-36 are preferably staggered as shown in FIG. 4 to provide for enhanced communication between roller 24 and bearings 28 as the roller rotates about axle 26. Normally, one or two sets of three holes 34-36 are drilled, but several are shown in FIG. 4 to emphasize the stagger.

Roller assembly 10 as shown in the drawings operates as follows. With cam shaft 12 in contact with rollers 24, the cam shaft rotates in the direction shown by arrow 38. The means for rotating cam shaft 12 are common and are thus not shown. As cam shaft 12 rotates, rollers 24 rotate in a cam-cam follower fashion (as outlined by arrow 40) and housings 14, 16 reciprocate as is common in an internal combustion or similar type engine. Lubricant 32 is delivered to cam shaft 12 in a common manner and drips onto the outer surface of roller 24. From there the fluid 32 travels through holes 34-36 and lubricates and/or cools bearings 28. The continuous supply of fluid 32 to bearings 28 and axle 26 through holes 34-36 insures that the bearings and axle are constantly lubricated even as some of the fluid vaporizes or evaporates during heat buildup in the engine.

It is understood that the invention is not limited by the above-given details, and may be modified within the scope of the following claims.

I claim:

1. In a roller assembly including a housing carrying a stationary axle, a roller rotatably positioned about said axle, and bearing means positioned between said axle and said roller, said bearing means for facilitating rotation of said roller about said axle, the improvement wherein said roller has a hole drilled therethrough communicating with said bearing means, said hole constituting conduit means for allow circulation of lubricant to said bearing means.

2. The roller assembly of claim 1 wherein said roller has a plurality of said holes therethrough communicating with said bearing means.

3. The roller assembly of claim 2 wherein said plurality of holes are axially and radially spaced along said roller.

4. The roller assembly of claim 3 wherein said housing seals said bearing means against intrusion of foreign particles.

5. The roller assembly of claim 3 wherein said roller contacts a cam shaft, and including means associated with the cam shaft for lubricating the cam shaft and roller assembly.

* * * * *